(12) United States Patent
Chen et al.

(10) Patent No.: US 10,652,313 B2
(45) Date of Patent: May 12, 2020

(54) DEPLOYING AN APPLICATION IN A HYBRID CLOUD COMPUTING ENVIRONMENT

(71) Applicant: VMware, Inc., Palo Alto, CA (US)

(72) Inventors: Ping Chen, Shanghai (CN); Yuanzhi Wang, Shanghai (CN); Wei Zhang, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 626 days.

(21) Appl. No.: 14/935,433

(22) Filed: Nov. 8, 2015

(65) Prior Publication Data

US 2017/0134301 A1    May 11, 2017

(51) Int. Cl.
*G06F 15/173* (2006.01)
*H04L 29/08* (2006.01)
*G06F 9/00* (2006.01)

(52) U.S. Cl.
CPC ............... *H04L 67/10* (2013.01); *G06F 9/00* (2013.01)

(58) Field of Classification Search
CPC ...... H04L 67/10; G06F 9/00; H04N 21/26291
USPC .................................................. 709/226, 220
See application file for complete search history.

(56) References Cited

U.S. PATENT DOCUMENTS

| | | | |
|---|---|---|---|
| 9,201,639 B2 | 12/2015 | Kumar et al. | |
| 9,633,381 B2* | 4/2017 | McKerlich | G06Q 30/04 |
| 9,853,861 B2 | 12/2017 | Mazhar et al. | |
| 9,984,428 B2* | 5/2018 | Doyle | G06Q 10/10 |
| 2008/0091837 A1* | 4/2008 | Langen | H04L 65/40 709/230 |
| 2009/0177567 A1* | 7/2009 | McKerlich | G06Q 30/04 705/35 |
| 2010/0003923 A1* | 1/2010 | McKerlich | H04L 12/14 455/67.11 |
| 2010/0250730 A1* | 9/2010 | Menzies | G06F 21/105 709/224 |
| 2011/0313966 A1* | 12/2011 | Schmidt | G06Q 10/10 706/52 |
| 2012/0054324 A1* | 3/2012 | Tada | H04L 12/66 709/223 |
| 2012/0066670 A1* | 3/2012 | Mccarthy | G06F 8/61 717/169 |
| 2013/0060838 A1 | 3/2013 | Yaffe | |
| 2013/0232463 A1 | 9/2013 | Nagaraja et al. | |
| 2013/0232480 A1 | 9/2013 | Winterfeldt et al. | |

(Continued)

*Primary Examiner* — Thanh T Nguyen
(74) *Attorney, Agent, or Firm* — Su IP Consulting

(57) ABSTRACT

An example method is provided for a computing system in a private cloud computing environment to deploy an application in a hybrid cloud computing environment. The method may comprise generating a request to deploy an application in a public cloud environment, the request including a deployment plan that specifies one or more tasks to be executed by a virtual computing resource from a cloud provider to deploy the application. The method may comprise sending, to an orchestration node in the public cloud computing environment, the request to instruct the orchestration node to provision the virtual computing resource from the cloud provider and to cause the virtual computing resource to execute the one or more tasks. The method may further comprise receiving, from the orchestration node in the public cloud environment, status data and determining whether the application is successfully deployed in the public cloud computing environment.

18 Claims, 9 Drawing Sheets

(56) References Cited

U.S. PATENT DOCUMENTS

| | | |
|---|---|---|
| 2013/0232497 A1 | 9/2013 | Jalagam et al. |
| 2013/0232498 A1* | 9/2013 | Mangtani .............. G06F 9/5072 |
| | | 718/104 |
| 2014/0181816 A1 | 6/2014 | Muller et al. |
| 2015/0134792 A1 | 5/2015 | Zhang et al. |
| 2015/0261514 A1 | 9/2015 | Fu et al. |
| 2015/0378716 A1* | 12/2015 | Singh ..................... H04W 4/60 |
| | | 717/172 |
| 2015/0381711 A1* | 12/2015 | Singh ................. H04L 41/0813 |
| | | 709/221 |
| 2016/0034315 A1* | 2/2016 | Soejima .................... G06F 8/61 |
| | | 718/103 |
| 2016/0094483 A1 | 3/2016 | Johnston et al. |
| 2016/0218938 A1 | 7/2016 | Gupte et al. |
| 2016/0364554 A1* | 12/2016 | Lincoln ................... G06F 21/10 |
| 2017/0048314 A1* | 2/2017 | Aerdts ................. G06F 9/5083 |
| 2017/0134519 A1 | 5/2017 | Chen et al. |
| 2017/0351535 A1 | 12/2017 | Mao et al. |
| 2018/0048314 A1 | 2/2018 | Zhang |
| 2019/0065165 A1* | 2/2019 | Troutman ............... H04L 67/10 |

* cited by examiner

DEPLOYING AN APPLICATION IN A HYBRID CLOUD COMPUTING ENVIRONMENT

CROSS-REFERENCE TO RELATED APPLICATION

This application entitled "Deploying an Application in a Hybrid Cloud Computing Environment" is related in subject matter to U.S. patent application Ser. No. 14/935,434 entitled "Deploying an Application in Multiple Cloud Computing Environments", which is incorporated herein by reference.

BACKGROUND

Unless otherwise indicated herein, the approaches described in this section are not admitted to be prior art by inclusion in this section.

The virtualization of computing resources provides opportunities for cloud service providers to sell virtual computing resources to enterprises. For example, using an Infrastructure-as-a-Service (IaaS) model, an enterprise (e.g., organization, business) may build, deploy and manage applications using virtual computing resources such as compute, storage and networking resources in a cloud computing environment. In practice, however, there are many challenges associated with application deployment in a cloud computing environment, and it is therefore desirable to provide improved solutions to better meet the needs of the enterprises.

DETAILED DESCRIPTION

Figure 1:
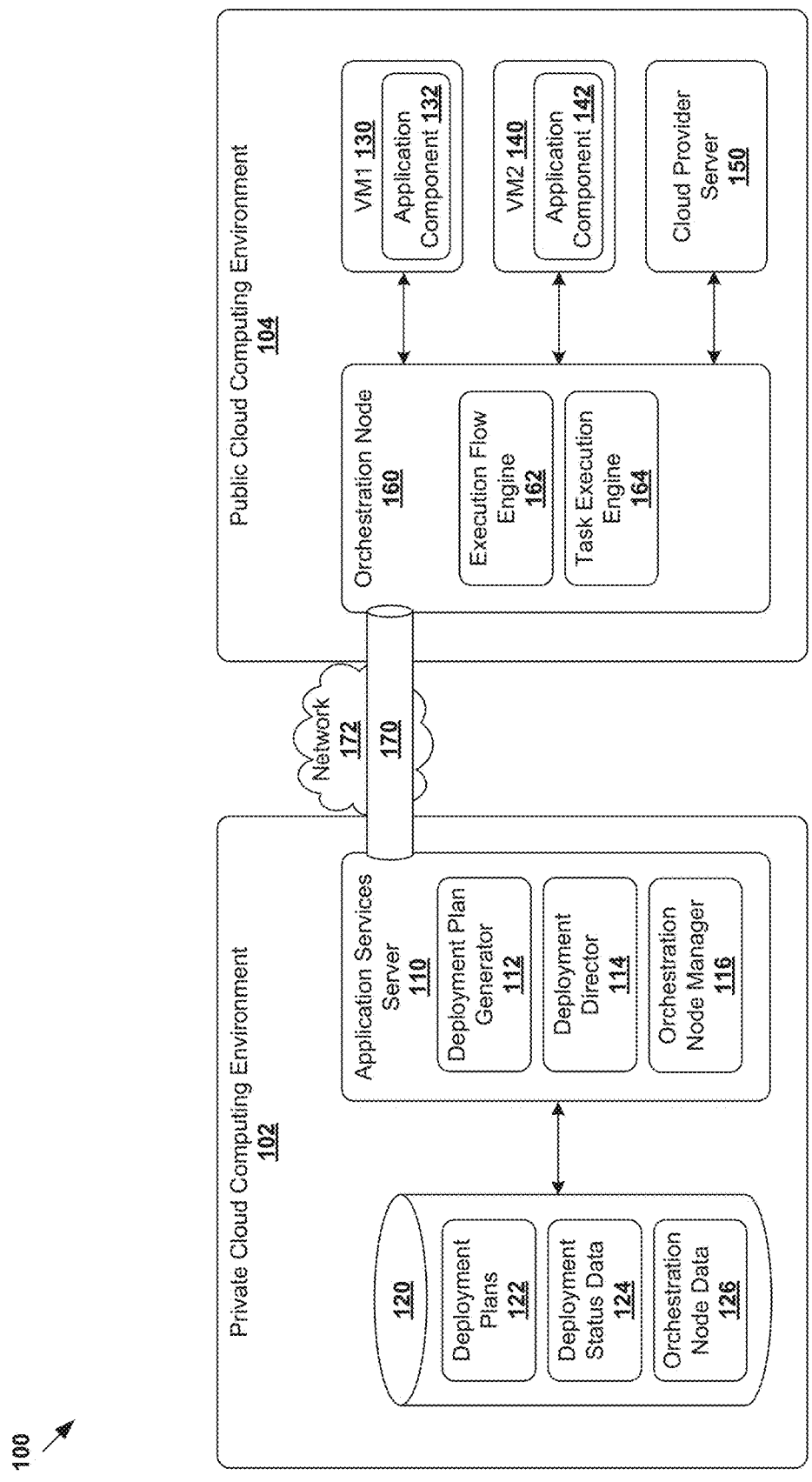
FIG. 1 is a schematic diagram illustrating an example hybrid cloud computing environment in which an application may be deployed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

In the present disclosure, various challenges associated with application deployment in a cloud computing environment will be explained. In particular, a first example to deploy an application in a hybrid cloud computing environment will be explained with reference to FIG. 1 to FIG. 6. A second example to deploy an application in multiple cloud computing environments will be explained with reference to FIG. 7 and FIG. 8.

According to examples of the present disclosure, application deployment may be performed using one or more "orchestration nodes" in both of the above examples. Throughout the present disclosure, the term "orchestration node" may generally refer to any suitable entity that is configured in a cloud computing environment to deploy an application in that cloud computing environment under the instruction of another entity (e.g., application services server). For example, during application deployment, the orchestration node may be instructed to execute one or more tasks and/or cause a virtual computing resource to execute one or more tasks. In practice, an orchestration node may be implemented using one or more physical devices, virtual machines, a combination of thereof, etc.

In more detail, FIG. 1 is a schematic diagram illustrating example hybrid cloud computing environment 100 in which an application may be deployed. Although an example is shown, it should be understood that example cloud computing environment 100 may include additional or alternative components, and each component may have a different configuration. In the example in FIG. 1, hybrid cloud computing environment 100 includes private cloud computing environment 102 and public cloud computing environment 104.

The term "private cloud computing environment" may generally represent a computing environment (e.g., data center) operated solely for an enterprise, organization, business, etc. Private cloud computing environment 102 (also known as a "private cloud", "private enterprise environment", etc.) may be managed internally by the enterprise, or externally by a third party. On the other hand, the term "public cloud computing environment" may generally represent a virtualized computing environment operated by a cloud provider.

Virtual computing resources in public cloud computing environment 104 may be purchased to extend the capabilities of private cloud computing environment 102. For example, an enterprise may purchase compute, storage and networking resources from a cloud provider to execute applications. This helps the enterprise reduce the costs of building, running and maintaining physical resources within private cloud computing environment 102. In practice, public cloud computing environment 104 may be operated by any suitable cloud provider, such as Amazon Elastic Compute Cloud (EC2), VMware vCloud Hybrid Service (vCHS), VMware vCloud Air, etc.

In the example in FIG. 1, application services server 110 (also referred to as "computing system") is configured to facilitate deployment of applications in public cloud computing environment 104 from private cloud computing environment 102. For example, application services server 110

(also known as "application director", etc.) may provide a suite of tools for enterprises to create, deploy, manage and update applications. An enterprise user (e.g., application developer, system administrator, etc.) may access application services server 110 using any suitable interface on a computing device, such as via a web browser, command line interface (CLI), etc.

Application services server 110 may be used to deploy a wide range of applications from simple web applications to complex custom applications. Throughout the present disclosure, the term "application" may generally refer to a logical deployment unit that includes one or more application components. Each "application component" may include any suitable software code, such as software services, scripts, code components, application-specific packages, custom script packages, etc. The application may be a single-tier, or multi-tier in which case functions of the application are distributed over logically separate application components.

Conventionally, it is necessary for application services server 110 in private cloud computing environment 102 to interact directly with cloud provider server 150 in public cloud computing environment 104. For example, during application deployment, it may be necessary to provision virtual computing resources in the form of virtual machines VM1 130 and VM2 140 from cloud provider server 150 to deploy respective application components 132 and 142 of an application. Each virtual machine may represent a logical node of the application. In practice, application services server 110 may have to manage the deployment of a large number of applications (e.g., hundreds, thousands), which in turn creates a lot of processing burden on application services server 110 and degrades performance.

Further, in some cases, it can be challenging for application services server 110 to manage the deployment of an application in public cloud computing environment 104 from private cloud computing environment 102. For example, due to security reasons (e.g., firewall settings), private cloud computing environment 102 may block external traffic originating from public cloud computing environment 104. Consequentially, communication between private cloud computing environment 102 and public cloud computing environment 104 may become unidirectional. In this case, application services server 110 will not be able to monitor the progress of an application deployment because any information originating from VM1 130, VM2 140 and cloud provider server 150 will be blocked.

According to examples of the present disclosure, the deployment of an application in a hybrid cloud computing environment 100 may be improved using orchestration node 160 in public cloud computing environment 104. In practice, orchestration node 160 may be implemented using one or more physical or virtual machines capable of communicating with application services server 110 in private cloud computing environment 102, as well as with cloud provider server 150 and virtual computing resources (e.g., VM1 130 and VM2 140) in public cloud computing environment 104.

Figure 2:
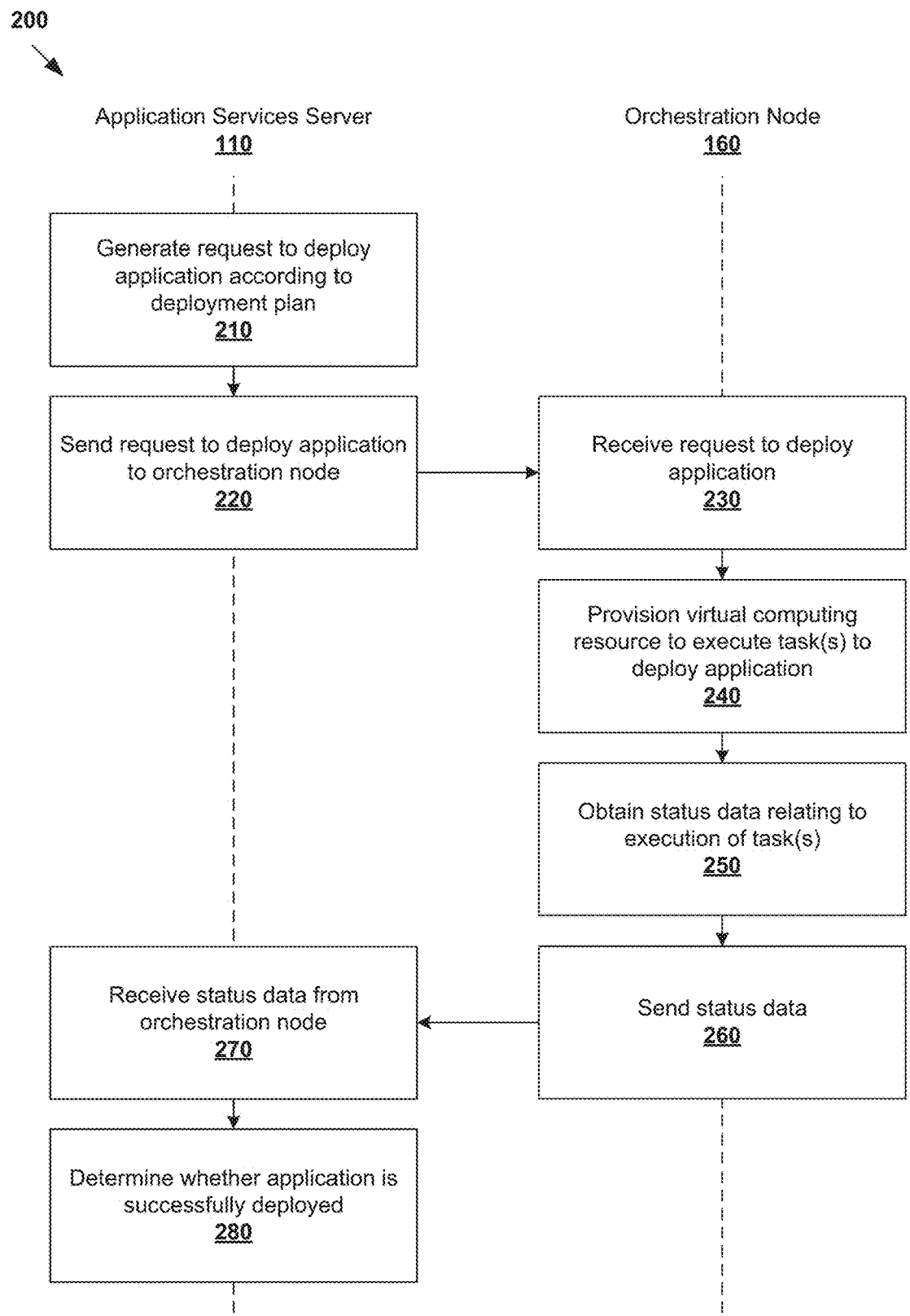
FIG. 2 is a flowchart of an example process to deploy an application in hybrid cloud computing environment.

In more detail, FIG. 2 is a flowchart of example process 200 to deploy an application in hybrid cloud computing environment 100. Example process 200 may include one or more operations, functions, or actions illustrated by one or more blocks, such as blocks 210 to 280. The various blocks may be combined into fewer blocks, divided into additional blocks, and/or eliminated based upon the desired implementation.

At 210 in FIG. 2, application services server 110 in private cloud computing environment 102 generates a request to deploy an application according to a deployment plan. In particular, the request includes the deployment plan specifying one or more tasks to be executed by a virtual computing resource (e.g., VM1 130, VM2 140) to deploy the application in public cloud computing environment 104.

In practice, generating the request may also include generating the deployment plan, or retrieving the deployment plan (see 122 in FIG. 1) from data store 120 accessible by application services server 110. Further, the request may be generated in response to an enterprise user (e.g., network administrator) initiating the deployment via application services server 110. In another example, the initiation may occur programmatically (e.g., using a script, based on a trigger, etc.).

At 220 in FIG. 2, application services server 110 sends the request to orchestration node 160. The request is to instruct orchestration node 160 to provision the virtual computing resource (e.g., VM1 130, VM2 140) from a cloud provider (e.g., by interacting with cloud provider server 150), and to cause the virtual computing resource to execute one or more tasks specified by the deployment plan.

At 230 and 240 in FIG. 2, orchestration node 160 receives the request from application services server 110, and deploys the application according to the deployment plan. As mentioned above, orchestration node 160 is to provision the virtual computing resource (e.g., VM1 130, VM2 140) from cloud provider server 150, and to cause the virtual computing resource to execute one or more tasks specified by the deployment plan.

In practice, multiple virtual computing resources may be provisioned, and orchestration node 160 is to coordinate task execution among them. For example in FIG. 1, orchestration node 160 may provision VM1 130 and VM2 140 from cloud provider server 150 according to the deployment plan. Orchestration node 160 may also cause VM1 130 and VM2 140 to execute tasks (e.g., scripts), such as to install, configure, start, stop, migrate or upgrade, respective application components 132, 142. Orchestration node 160 may also coordinate task execution by VM1 130 and VM2 140 according to an order specified by the deployment plan, such as to satisfy dependencies between them. Orchestration node 160 may also cause VM1 130 and VM2 140 to retrieve a particular software packages from a software repository to perform any suitable installation.

At 250 and 260 in FIG. 2, orchestration node 160 obtains status data from the virtual computing resources, and reports the status data to application services server 110. At 270 and 280 in FIG. 2, application services server 110 receives status data from orchestration node 160 and determines whether the application is successfully deployed in public cloud computing environment 104.

Using example process 200 in FIG. 2, application services server 110 may delegate control to orchestration node 160 to deploy applications in public cloud computing environment 104. Since orchestration node 160 is located within the same environment 104 as cloud provider server 150 and virtual computing resources (e.g., VM1 130 and VM2 140), orchestration node 160 is able to coordinate task execution more effectively, obtain status data relating to task execution and report the same to application services server 110. In practice, the status data may include a task status (e.g., incomplete, complete, in progress), a task start time and a task end time relating to each task specified by the deployment plan.

Further, according to examples of the present disclosure, application services server 110 may establish a persistent connection (see 170 in FIG. 1) with orchestration node 160 to receive the status data. For example, persistent connection 170 may be used to circumvent firewall settings at private cloud computing environment 102 that block any traffic originating from public cloud computing environment 104. This allows application services server 110 and orchestration node 160 to communicate with each other, without having to modify settings of the firewall. Such modification may not always be possible for various reasons, such as when the enterprise does not have the authority to modify the firewall settings, etc.

Using persistent connection 170 from application services server 110 to orchestration node 160, orchestration node 160 may send status data during the application deployment process, such as periodically or whenever the status data is available. Further, since application services server 110 interacts directly with orchestration node 160, one persistent connection between them is generally sufficient. This should be contrasted with the need to manage separate connections with cloud provider server 150, VM1 130 and VM2 140 in the example in FIG. 1 according to the conventional approach.

In practice, any suitable persistent connection 170 may be established over any suitable network 172, such as Hypertext Transfer Protocol (HTTP) Keep-Alive over an Internet Protocol (IP) network, etc. Persistent connection 170 may also be established over a tunnel between application services server 110 and orchestration node 160, such as secure cloud tunnel. Application services server 110 may maintain persistent connection 170 while the application is being deployed (e.g., by sending keep-alive messages to orchestration node 160 periodically), and close persistent connection 170 when the application is successfully deployed.

Application services server 110 and orchestration node 160 may implement any suitable modules to perform example process 200. For example, application services server 110 may include deployment plan generator 112 to generate a deployment plan based on which an application is deployed; deployment director 114 to request orchestration node 160 to deploy an application; and orchestration node manager 116 to configure and manage orchestration node 160.

Orchestration node 160 may include execution flow engine 162 to coordinate the provisioning of virtual computing resources and task execution, and task execution engine 164 to cause orchestration node 160 and virtual computing resources to execute tasks specified in the deployment plan. As will be described further below, task execution engine 162 is to cause orchestration node 160 to execute tasks to provision new virtual machines, configure settings of public cloud computing environment 104, take a snapshot of virtual machines, etc. Task execution engine 162 is also to cause VM1 130 and VM2 140 to execute tasks to deploy respective application components 132 and 142. Any additional and/or alternative modules may be used in practice.

Pool of Orchestration Nodes

Figure 3:
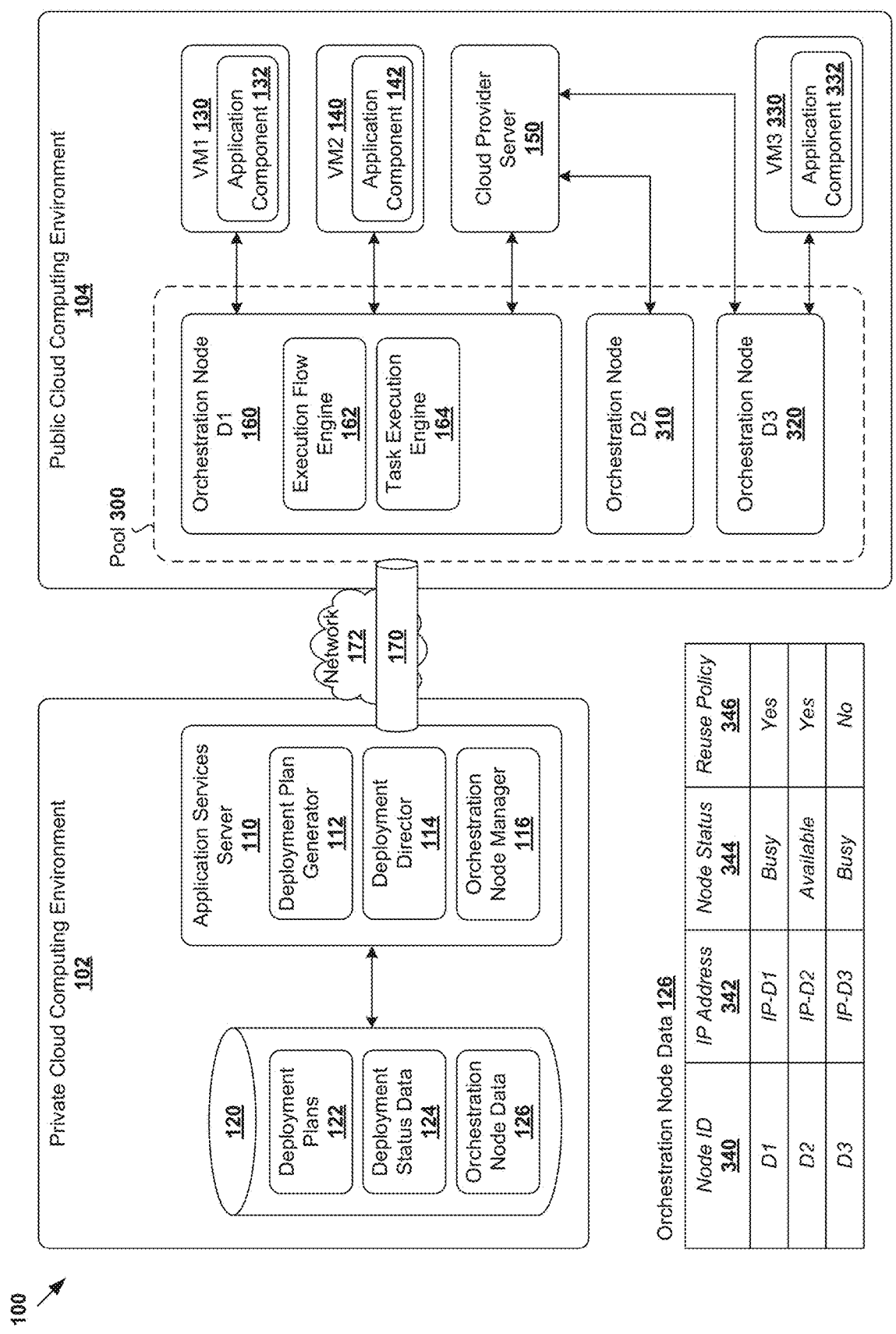
FIG. 3 is a schematic diagram illustrating an example pool of orchestration nodes in a public cloud computing environment.

According to examples of the present disclosure, application services server 110 may configure a pool of orchestration nodes to deploy applications in public cloud computing environment 104. In more detail, FIG. 3 is a schematic diagram illustrating example pool 300 of orchestration nodes in public cloud computing environment 104. Although an example is shown, it should be understood that pool 300 may include any suitable number of orchestration nodes, and additional and/or alternative nodes may be configured.

For example in FIG. 3, example pool 300 includes three orchestration nodes. In addition to orchestration node 160 (labelled "D1") introduced in FIG. 1, there are two additional orchestration nodes 310 (labelled "D2") and 320 (labelled "D3"). By creating orchestration node pool 300 in public cloud computing environment 104, processing load associated with application deployment may be distributed across multiple orchestration nodes. This distributed approach improves deployment efficiency and fault tolerance, especially when a large number of applications are deployed. Further, this distributed approach eliminates, or at least reduces the impact of, application services server 110 as a single point of failure when multiple applications are deployed concurrently.

Orchestration nodes D1 160, D2 310 and D3 320 are connected to cloud provider server 150, and able to deploy an application using virtual computing resources in public cloud computing environment 104. For example in FIG. 1, D1 160 is to coordinate task execution by VM1 130 and VM2 140 to deploy respective application components 132 and 134. On the other hand, D3 310 is to coordinate task execution by VM3 330 to deploy application component 332. In practice, any suitable number of orchestration nodes may be configured, and the size of pool 300 over time depending upon the desired implementation.

As a new orchestration node is configured and registered, application services server 110 (e.g., orchestration node manager 116) updates orchestration node data 126 in data store 120. For example, each orchestration node 160/310/320 is associated with node identifier (ID) 340, Internet Protocol (IP) address 342, node status (e.g., busy, available, etc.) 344 and reuse policy 346 associated with the new orchestration node. As will be explained further using FIG. 4 and FIG. 5, the reuse policy may be configured to govern whether a orchestration node is returned to pool 300 (i.e., reuse=yes) or deleted (i.e., reuse=no) after an application is deployed.

Throughout the present disclosure, the term "delete" may refer generally to an operation to remove an orchestration node from public cloud computing environment 104, such as by releasing the resources to operate the orchestration node and deregistering it from application services server 110. In practice, the term "delete" may be used interchangeably with "destroy," "remove," "terminate," "deallocate," "deregister", etc.

The reuse policy allows application services server 110 to manage the size of pool 300 as nodes are configured or deleted. For example, D1 160 and D2 310 are configured as multi-use nodes (i.e., reuse=yes), while D3 320 as a single-use node (i.e., reuse=no). Although not shown in FIG. 3, a particular number of reuse may also be configured (e.g., 10 times for D1 160, and 5 times for D2 310), after which the orchestration node is deleted.

Deploying an Application in a Hybrid Cloud Computing Environment

Figure 4:
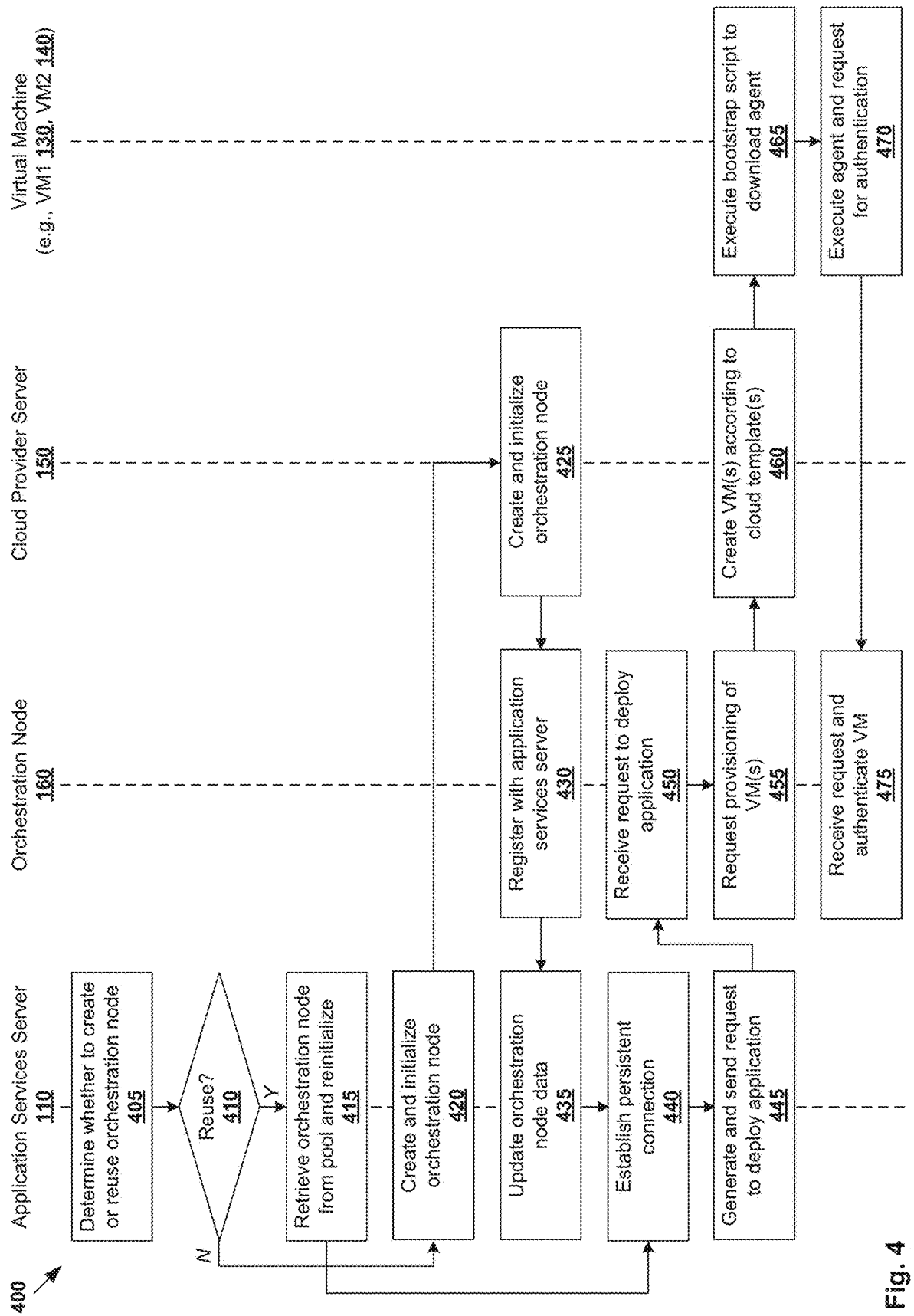
FIG. 4 is a flowchart of an example detailed process to provision virtual machines using an orchestration node in hybrid cloud computing environment.

FIG. 4 is a flowchart of example detailed process 400 to provision virtual machines using orchestration node 160 in hybrid cloud computing environment 100. Example process 400 may include one or more operations, functions, or actions illustrated by one or more blocks, such as blocks 405 to 475. The various blocks may be combined into fewer blocks, divided into additional blocks, and/or eliminated based upon the desired implementation. In the following orchestration node 160 (also labelled "D1" in FIG. 3) will be used as an example node configured or retrieved from pool 300 to deploy an application.

Referring first to 405 in FIG. 4, application services server 110 determines whether to create a new orchestration node or reuse an existing one. The determination may involve retrieving orchestration node data 126 from data store 120 (e.g., using orchestration node manager 116). For example, application services server 110 may decide to create a new orchestration node 160 if none has been created (i.e., empty pool 300), or none of the existing ones is available (e.g., status=busy in pool 300).

At 410 and 415 in FIG. 4, application services server 110 decides to retrieve an existing orchestration node 160 from pool 300. For example, this may occur when existing orchestration node 160 from pool 300 is available. In another example, although none in pool 300 is currently available (e.g., status=busy for D1 160, D2 310 and D3 320), application services server 110 may determine whether there is any reusable orchestration node (i.e., reuse=yes for D1 160) that is currently busy, but will become available at a later time. If yes, application services server 110 may decide to wait, such as when the deployment is not time-sensitive, etc.

Otherwise, at 410 and 420 in FIG. 4, application services server 110 decides to create new orchestration node 160 by sending a request to cloud provider server 150 in public cloud computing environment 104. At 425 in FIG. 4, cloud provider server 150 proceeds to create and initialize orchestration node 160, such as by provisioning one or more virtual machines in public cloud computing environment 104 to implement orchestration node 160. Cloud provider server 150 may perform (or cause orchestration node 160 to perform) any necessary installation according to the request from application services server 110.

At 430 and 435 in FIG. 4, newly created orchestration node 160 registers with application services server 110, which then updates orchestration node data 126. Referring to FIG. 3 again, orchestration node 160 may be configured with reuse policy 346 to specify whether to delete or reuse it after an application is performed. Orchestration node 160 may also publish a series of services application programming interfaces (APIs) accessible by application services server 110 for subsequent operations. Although an example is shown in FIG. 4, orchestration node 160 may also be created by a user (e.g., network administrator) by interacting directly with cloud provider server 150, rather than having to access application services server 110.

At 440 in FIG. 4, application services server 110 establishes connection 170 with orchestration node 160, such as persistent connection to circumvent firewall settings at private cloud computing environment 102. The persistent connection is maintained throughout the deployment process. For example, a keep-alive message may be transmitted periodically by application services server 110 to orchestration node 160, such as empty Transport Control Protocol (TCP) segments, etc. Since the persistent connection is established from private cloud computing environment 102, this allows orchestration node 160 to send status data relating to task execution to application services server 110.

At 445 in FIG. 4, application services server 110 generates and sends a request to orchestration node 160 to deploy an application according to deployment plan 122. The request may be sent in response to an enterprise user initiating the application deployment by accessing application services server 110. The application may be a new application, or an existing application in which case a newer version of the application is deployed.

Generating the request may include retrieving deployment plan 122 from data store 120, or generating deployment plan 122 from an application blueprint (e.g., using deployment plan generator 112). In the latter case, U.S. Patent Application No. 20130232498, which is assigned to the assignee of this application and entitled "System to Generate a Deployment Plan for a Cloud Infrastructure According to Logical, Multi-Tier Application Blueprint", is fully incorporated herein by reference to explain possible approaches to generate a deployment plan.

In practice, an application blueprint may specify a topology of virtual computing resources, application components to be executed on the virtual computing resources, one or more dependencies between the application components, etc. While an application blueprint provides a component-oriented view of the topology of an application, deployment plan 122 provides a step-oriented view of the topology that includes time dependencies between tasks to deploy the application components in a particular order.

Deployment plan 122 may include deployment settings (e.g., virtual computing resources such as CPU, memory, networks) and an execution plan of tasks having a specified order in which virtual machines are provisioned and application components are installed, configured, started, stopped, etc. Different deployment plans may be generated from a single application blueprint for various stages of an application, such as development, testing, staging and production, etc.

At 450 in FIG. 4, orchestration node 160 receives the request from application services server 110 and determines the tasks to be executed according to the deployment plan. For example, at 455 and 460 in FIG. 4, the request causes orchestration node 160 provision virtual computing resources from cloud provider server 150. In the example in FIG. 1, virtual machines VM1 130 and VM2 140 may be provisioned according to cloud templates published by a cloud provider.

The term "cloud template" may refer generally to a virtual machine template that describes the configuration of a virtual machine, including central processing unit (CPU), memory, network, storage, guest operating systems and other supporting libraries that are necessary to create the virtual machine. In practice, any suitable cloud template may be used, such as Amazon Machine Image for Amazon Region, application services template for vCloud Director, vRealize automation blueprint for vRealize Automation, etc.

At 465 in FIG. 4, virtual machine 130/140 boots and executes a bootstrap script included in the virtual machine to establish communication with orchestration node 160. For example, the bootstrap script provides a location (e.g., uniform resource locator (URL)) to download an agent from application services server 110, orchestration node 160, or any suitable repository. In practice, the agent may be downloaded in the form of a software package, such as Java Archive (JAR) that runs in a Java virtual machine, etc.

At 470 in FIG. 4, the agent is executed on virtual machine 130/140 by installing the downloaded software package. The agent then proceeds to send an authentication request to orchestration node 160, which then authenticates the agent. Any suitable approach may be used for the authentication. For example, the software package downloaded at 470 in FIG. 5 may include authentication information (e.g., password) that may be used by the agent. In response, at 475 in FIG. 4, orchestration node 160 authenticates the agent by generating and transmitting cryptographic information (e.g., digital certificate) for use in future communication.

In the above examples, communication between orchestration node 160, cloud provider server 150 and virtual machines 130 and 140 (via respective agents; see 465 and 470 in FIG. 4) may be implemented using any suitable approach. In one example, an address and discovery layer that leverages message queue technology may be used. In another example, each virtual machine 130/140 (e.g., its agent in particular) may provide a Representational State Transfer (RESTful) application programming interface (API) to accept instructions or requests from orchestration node 160. In this case, during the deployment process, orchestration node 160 may send a task execution request to an agent executing on virtual machine 130/140, and wait for a response from the agent.

Figure 5:
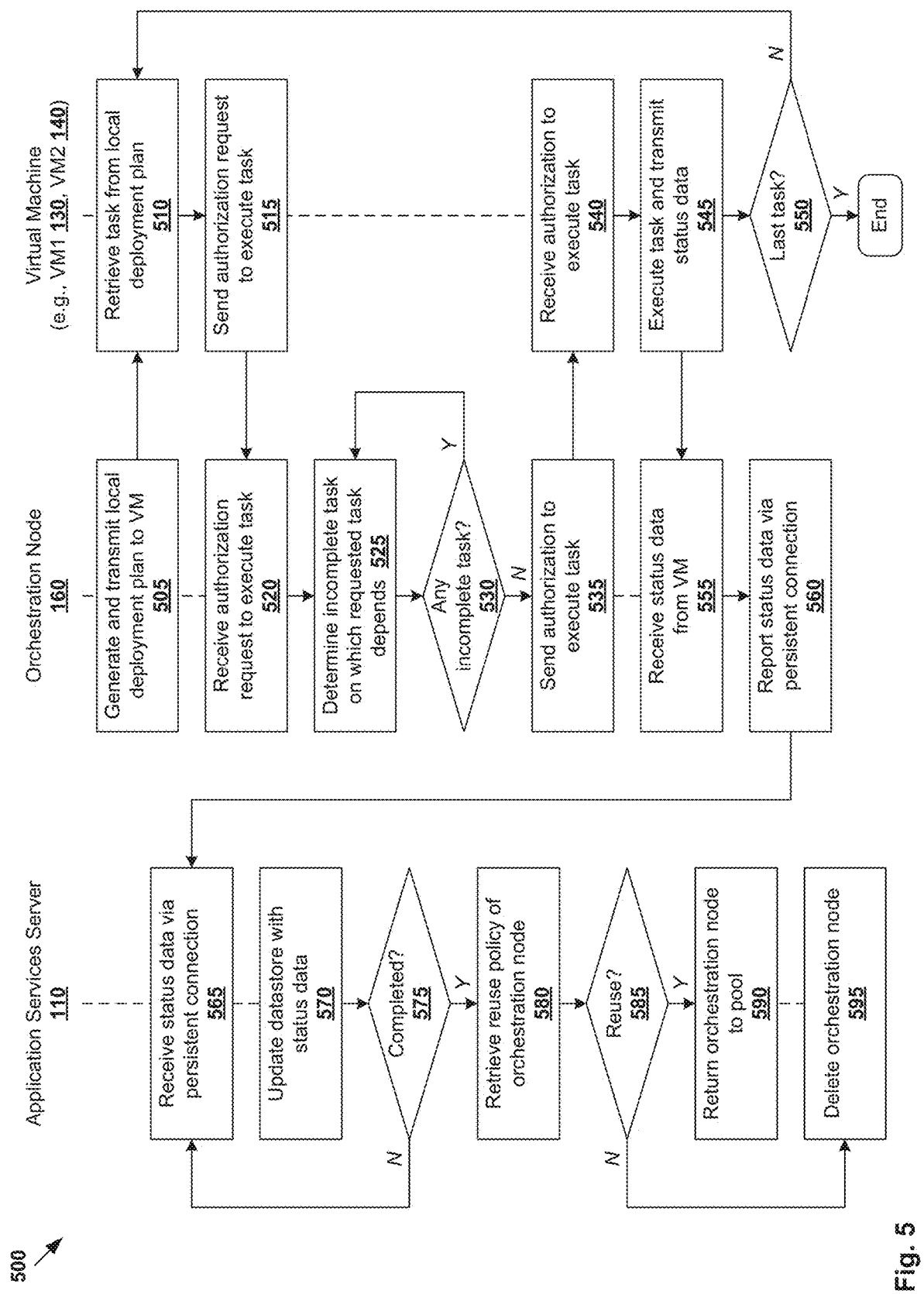
FIG. 5 is a flowchart of an example detailed process to coordinate task execution using an orchestration node in a hybrid cloud computing environment.

Example process 400 in FIG. 4 continues to FIG. 5, which is a flowchart of example detailed process 500 to coordinate task execution using orchestration node 160 in hybrid cloud computing environment 100. Example process 500 may include one or more operations, functions, or actions illustrated by one or more blocks, such as blocks 505 to 595. The various blocks may be combined into fewer blocks, divided into additional blocks, and/or eliminated based upon the desired implementation.

At 505 in FIG. 5, orchestration node 160 generates a "local deployment plan" for virtual machine 130/140 from (global) deployment plan 122 in the request from application services server 110. Each local deployment plan specifies a series of tasks to be executed by particular virtual machine 130/140 and an order in which the tasks are executed to implement an application component 132/142. The tasks in the local deployment plan may be in the form of scripts that, when executed by virtual machine 130/140, cause virtual machine 130/140 to, for example, install, configure, start, stop, upgrade or migrate at least one application component.

For example in FIG. 1, a first local deployment plan may be generated for and transmitted to VM1 130 to install, configure and start first application component 132. Similarly, a second local deployment plan may be generated for and transmitted to VM2 140 to install, configure and start second application component 142. For example, in an online store application, first application component 132 may implement a web server that executes a web application. Second application component 142 may implement a data store accessible by the web server. Although not shown in FIG. 1 for simplicity, a cluster of virtual machines may be used.

At 510 in FIG. 5, each virtual machine 130/140 receives the local deployment plan and determines a task to be executed according to an order specified by the local deployment plan. At 515 in FIG. 5, prior to executing each task, virtual machine 130/140 sends an authorization request to orchestration node 160.

Orchestration node 160 coordinates task execution by controlling the order in which tasks are executed by virtual machine 130/140. At 520 and 525 in FIG. 5, orchestration node 160 receives the authorization request from virtual machine 130/140 and determines whether the requested task depends on any incomplete task according to deployment plan 122. The dependencies between tasks may be within the same virtual machine and/or between different virtual machines. The determination is based on status data of tasks in deployment plan 122 and dependencies among the tasks. All tasks are marked as "incomplete" at the beginning of the deployment, and transition to "in progress" and finally "complete" upon completion.

At 530 in FIG. 5, if the requested task depends on an incomplete task, orchestration node 160 may return to 525 to check for completion of the incomplete task periodically. Otherwise (i.e., no incomplete task), at 535 in FIG. 5, orchestration node 160 authorizes virtual machine 130/140 to proceed with the task execution. In this case, orchestration node 160 may also update status data relating to the task, such as from "incomplete" to "in progress."

At 540 and 545 in FIG. 5, virtual machine 130/140 receives the authorization and proceeds to execute the task. The task execution may be performed based on additional information (e.g., parameter values) provided by orchestration node 160. Once completed, virtual machine 130/140 transmits status data to orchestration node 160. At 550 in FIG. 5, the virtual machine determines whether there is any additional task in its local deployment plan. If yes, blocks 510, 515, 540, 545 and 550 are repeated until all tasks are executed.

At 555 in FIG. 5, orchestration node 160 receives status data relating to a task, such as when the task is completed. In this case, orchestration node 160 may update the status of the task from "in progress" to "complete." Orchestration node 160 may also record task start times (e.g., when authorization is provided at 535), and task end times (e.g., when status data is received at 555), etc.

At 560 in FIG. 5, orchestration node 160 reports the status data of each task to application services server 110 via connection 170 (e.g., persistent connection). At 565 and 570 in FIG. 5, application services server 110 receives the status data and proceeds to update deployment status data 124 in data store 120 accordingly. For example, tasks may be marked as "incomplete", "complete" or "in progress", and associated task start times and end times recorded.

At 575 in FIG. 5, application services server 110 determines whether the application is successfully deployed, which means execution of tasks specified by deployment plan 122 has been completed. If not completed, application services server 110 waits for additional status data and repeats blocks 565, 570 and 575 until all task are completed. Otherwise, if completed, application services server 110 proceeds to block 580.

At 580 in FIG. 5, application services server 110 retrieves reuse policy 346 (see FIG. 3) configured for orchestration node 160. At 585 and 590 in FIG. 5, if orchestration node 160 is reusable (e.g., reuse=yes), application services server 110 returns orchestration node 160 to pool 300. In this case, node status 344 (see FIG. 3) of orchestration node 160 is also updated from "busy" to "available."

Otherwise, at 595 in FIG. 5 (i.e., reuse=no), orchestration node 160 is deleted. For example, application services server 110 may send a request to cloud provider server 150 to delete orchestration node 160. In another example, application services server 110 may cause orchestration node 160 to send a request to cloud provider server 150 to perform the deletion.

Deploying an Application in Multiple Cloud Environments

In the examples in FIG. 1 to FIG. 5, an application is deployed in public cloud computing environment 104 from private cloud computing environment 102. In practice, it may also be desirable to deploy the same application (e.g., based on the same application blueprint) in different cloud computing environments, such as during the development, testing and staging and production stages of an application. This may be desirable for various other reasons, such as efficiency, performance, regulation, redundancy, risk mitigation, etc. Since different cloud computing environments generally have different requirements due to different interfaces (e.g., APIs), protocols, virtual computing resource formats, this complicates application deployment.

Figure 6:
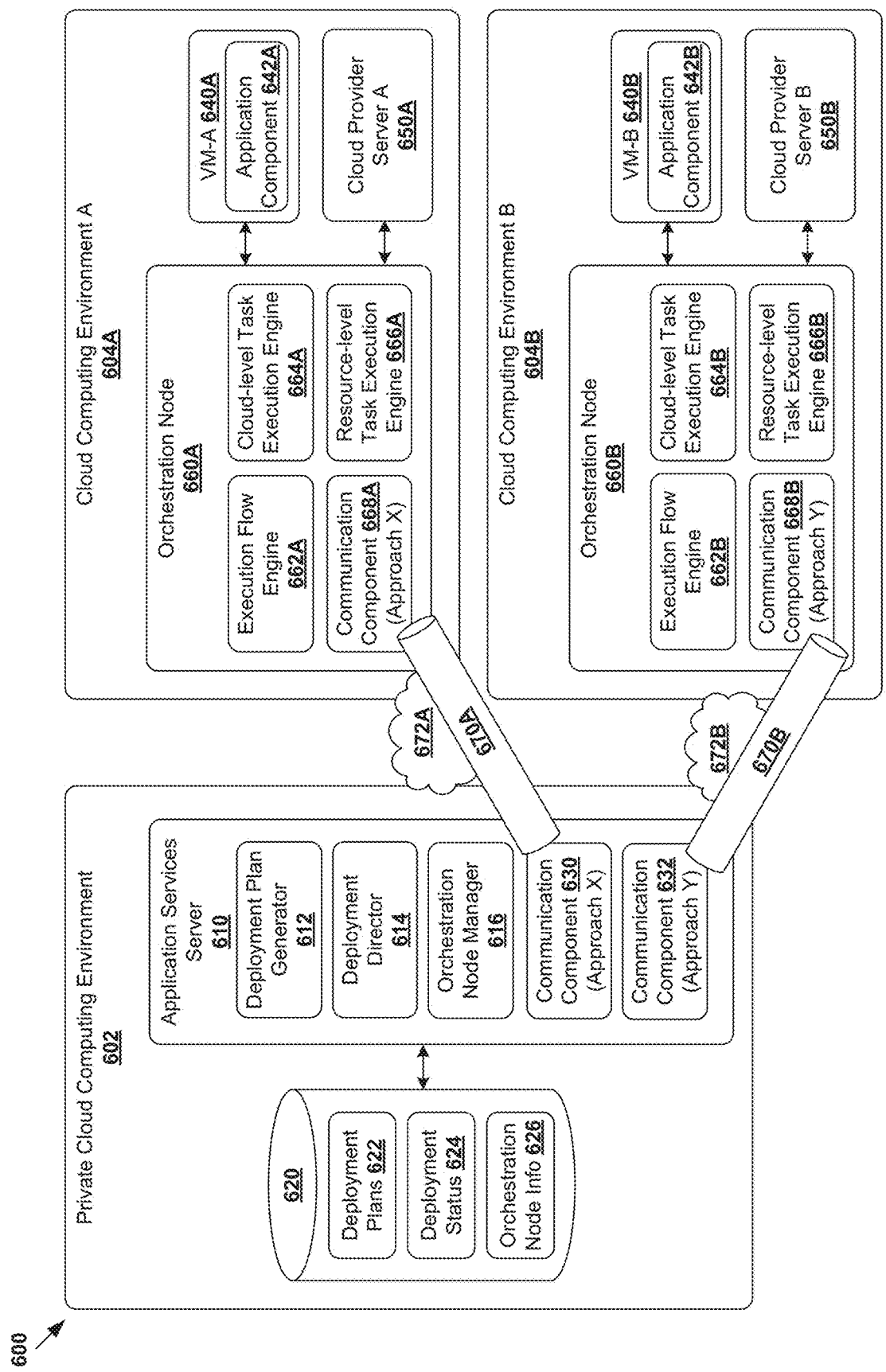
FIG. 6 is a schematic diagram illustrating example network environment in which an application is deployed in multiple cloud computing environments.

According to examples of the present disclosure, multiple orchestration nodes may be deployed in respective cloud computing environments to facilitate application deployment. In more detail, FIG. 6 is a schematic diagram illustrating example network environment 600 in which an application is deployed in multiple cloud computing environments. Although an example is shown, it should be understood that example network environment 600 may include additional or alternative components, and each component may have a different configuration.

In the example in FIG. 6, it is desirable to deploy an application to multiple cloud computing environments, such as first cloud computing environment 604A and second cloud computing environment 604B. In the following, reference numerals with a suffix "A" relates to elements in first cloud computing environment 604A, and suffix "B" to that in second cloud computing environment 604B. Although two examples are illustrated in FIG. 6 for simplicity, application services server 610 may be configured to support application deployment in any suitable number of environments.

In one example, first cloud computing environment 604A may be a public cloud computing environment, and second cloud computing environment 604B a private cloud computing environment. In another example, both 604A and 604B may be public cloud computing environments, but operated by different cloud providers (e.g., Amazon Elastic Compute Cloud, VMware vCloud Hybrid Service, VMware vCloud Air, etc.). In a third example, both 604A and 604B may be private cloud computing environments.

To support application deployment, first orchestration node 660A is deployed in first cloud computing environment 604A and second orchestration node 660B in second cloud computing environment 604B. Each orchestration node 660A/660B implements execution flow engine 662A/662B (similar to 162 in FIG. 1) to control execution of a deployment plan. To customize for a specific cloud computing environment 604A/604B, each orchestration node 660A/660B may implement cloud-level task execution engine 662A/662B to coordinate the execution of cloud-level tasks.

Here, the term "cloud-level tasks" may refer generally operations that are performed on a cloud level and specific to a particular cloud computing environment 604A/604B. For example, cloud task execution engine 662A/662B may be configured to access services of cloud provider server 650A/650B (e.g., via provider-specific API) to provision virtual computing resources (e.g., virtual machines); take a snapshot of virtual machines; add, update or remove devices on virtual machine; configure network or storage resources in, or settings of, cloud computing environment 604A/604B, etc. Cloud-level task execution engine 662A/662B may be configured to provision virtual machines (e.g., see 640A/640B) according to a cloud template specific to cloud computing environment 604A/604B, such as vSphere template, vSphere VM, Amazon Machine Image, etc.

Other tasks, referred to as "resource-level tasks", may be coordinated using resource-level task execution engine 666A/666B. Here, the term "resource-level tasks" may refer generally to operations that are performed at a virtual computing resource level (e.g., virtual machine level), such as to coordinate execution of one or more tasks (e.g., scripts) to install, configure, start, stop, update or migrate an application component on virtual machine 640A/640B. In general, the implementation of resource-level task execution engine 666A/666B may be the same or similar in different cloud computing environments 604A, 604B.

Similar to the example in FIG. 1, application services server 610 in private cloud computing environment 602 may implement deployment plan generator 612 to generate deployment plans 122; deployment director 614 to deploy an application using orchestration node 660A/660B; and orchestration node manager 616 to configure and manage orchestration node 660A/660B. To support different communication approaches, application services server 610 further implements first communication component 630 to communicate with first orchestration node 660A, and second communication component 632 to communicate with second orchestration node 660B.

Each communication component 630/632 may support any suitable "communication approach," such as first approach "X" and second approach "Y" illustrated in FIG. 6. Here, the term "communication approach" may refer generally to a type or mode of communication, such as persistent connection (e.g., using HTTP keep-alive), non-persistent connection (e.g., bidirectional communication using polling, message queue), etc. For example, communication component 630/632 may be configured to be a "communication plugin" to establish connection 670A/670B with orchestration node 660A/660B over any suitable network 672A/672B. The term "plugin", as used in this disclosure may refer to a separate computer program (e.g., software component, executable instructions) that runs or executes in its own (independent) process to provide additional features and functionality to application services server 610. In practice, the same plugin or different plugins may be used to support the same communication approach.

Depending on the corresponding communication approach, connection 670A/670B may be persistent or non-persistent, etc. For example, first cloud computing environment 604A may be a public cloud, and second cloud computing environment 604B a private cloud. In this case, communication component 630 is configured to establish first connection 670A as a persistent connection similar to FIG. 1, and communication component 632 to establish second connection 670A as a non-persistent connection.

It should be understood that communication component 630/632 is not tied to a particular cloud computing environment, but rather to a particular communication approach (represented as X and Y in FIG. 6). As such, each communication component 630/632 may be used for multiple cloud computing environments that support the same communication approach. As shown in FIG. 6, each orchestration node 660A/660B may further implement communication component 668A/668B to communicate with corresponding component 630/632 at application services server 110.

Although not shown in FIG. 6, it should be understood that network environment 600 may include any further cloud computing environment, say C. In this case, communication component 630 may be used communication approach X is supported by cloud computing environment C or communication component 632 if communication approach Y is supported. Otherwise, application services server 610 may implement an additional communication component to support a new communication approach (say Z).

Figure 7:
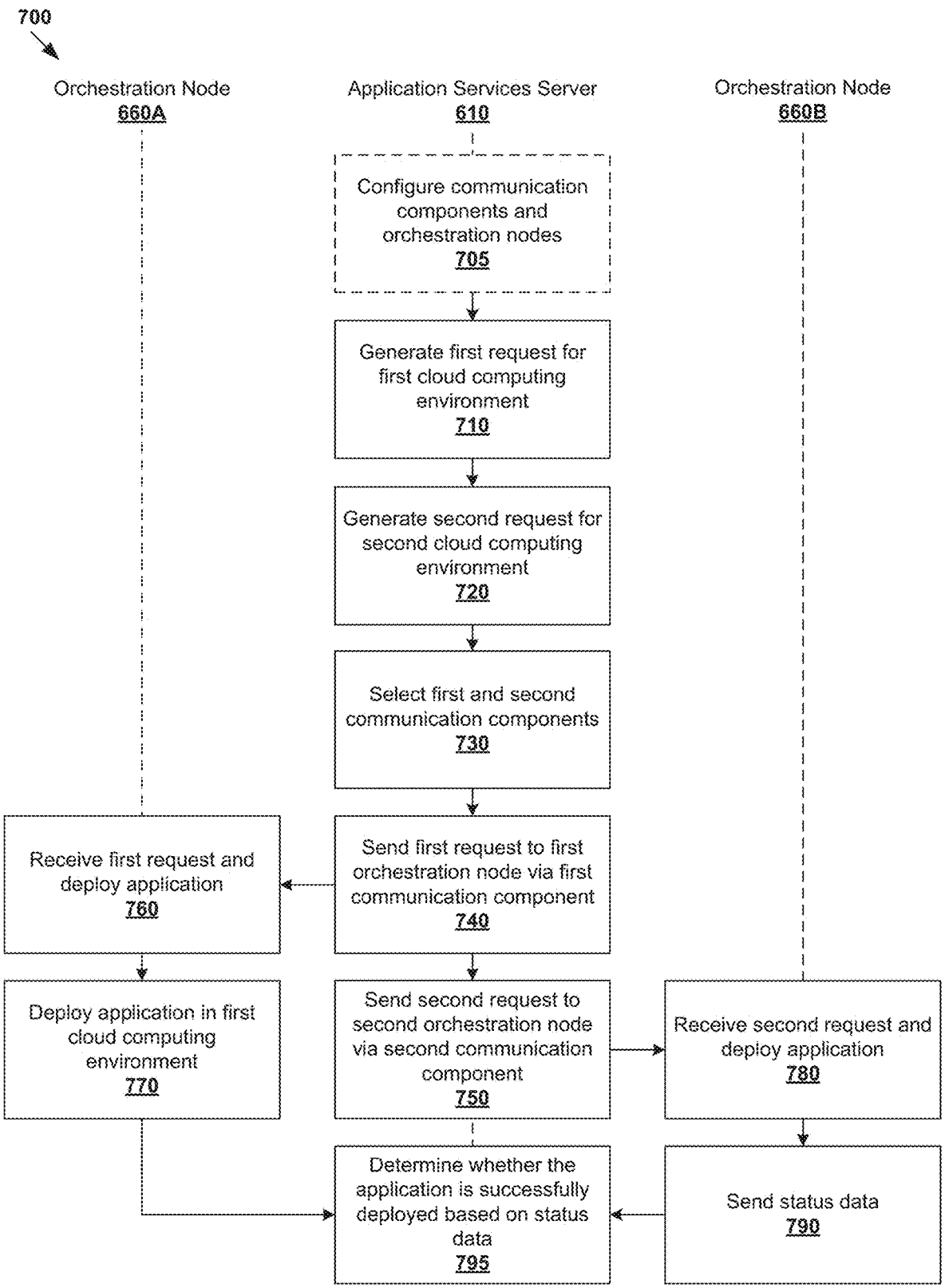
FIG. 7 is a flowchart of an example process to deploy an application in multiple cloud computing environments.

FIG. 7 is a flowchart of example process 700 to deploy an application in multiple cloud computing environments 604A, 604B. Example process 700 may include one or more operations, functions, or actions illustrated by one or more blocks, such as blocks 705 to 790. The various blocks may be combined into fewer blocks, divided into additional blocks, and/or eliminated based upon the desired implementation.

At 705 in FIG. 7, application services server 610 configures communication component 630/632 and orchestration node 660A/660B for each cloud computing environment 604A/604B in which application deployment is required. Although an example is shown (in dotted line), communication components 630, 632, and/or orchestration nodes 660A, 660B may be configured independently or separately, such as a new type of cloud computing environment is supported. The configuration at 705 may be initiated by a user (e.g., network administrator using a web interface, CLI, etc.) via application services server 610, or initiated programmatically (e.g. based on a trigger, etc.).

Orchestration node 660A may be configured to coordinate execution of cloud-level tasks specific to first cloud computing environment 604A (e.g., using 664A in FIG. 6), as well as resource-level tasks (e.g., using engine 666A in FIG. 6) during the application deployment. First communication component 630 is configured to establish connection 670A with orchestration node 660A to facilitate application deployment in first cloud computing environment 604A. Using an example discussed above, first communication component 630 may establish a persistent connection 670A with corresponding component 668A that supports the same communication approach.

Similarly, orchestration node 660B may be configured to coordinate execution of cloud-level tasks specific to second cloud computing environment 604B (e.g., using 664B in FIG. 6), as well as resource-level tasks (e.g., using 666B in FIG. 6). Second communication component 632 is configured to establish connection 670B with orchestration node 660B facilitate application deployment in second cloud computing environment 604B. Using an example discussed above, second communication component 632 may establish a non-persistent connection 670B (e.g., bidirectional polling connection) with corresponding component 668B that supports the same communication approach.

At 710 in FIG. 7, application services server 610 generates a first request to deploy an application in first computing environment 604A according to a first deployment plan. For example, the first deployment plan specifies one or more tasks to be executed by a virtual computing resource, such as VM-A 640A to deploy application component 642A.

Similarly, at 720 in FIG. 7, application services server 610 generates a second request to deploy an application in second computing environment 604B according to a second deployment plan. For example, the second deployment plan specifies one or more tasks to be executed by a virtual computing resource, such as VM-B 640B to deploy application component 642B.

Similar to the examples in FIG. 1 to FIG. 5, the deployment plans may be generated using deployment plan generator 612. In practice, the same application blueprint may be used to generate different deployment plans for respective cloud computing environments 604A, 604B. Each deployment plan may be retrieved from data store 620 (see also 622), or generated at 720 and 730 in FIG. 7.

At 730 in FIG. 7, a communication component is selected based on the type of cloud computing environment in which the application is to be deployed. For example, application services server 610 selects first communication component 630 to communicate with first orchestration node 660A (e.g., via corresponding 668A) in first cloud computing environment 604A and second communication component 632 to communicate with second orchestration node 660B (e.g., via corresponding 668B) in second cloud computing environment 604B.

At 740 and 750 in FIG. 7, application services server 610 sends the first request to first orchestration node 660A via first communication component 630, and the second request to second orchestration node 660B via second communication component 632. Each request is to instruct orchestration node 660A/660B to provision virtual computing resource 640A/640B and to cause virtual computing resource 640A/640B to one or more tasks to deploy the application. As discussed above, connection 670A/670B with orchestration node 660A/660B may be established using communication component 630/632.

At 760 and 780 in FIG. 7, orchestration node 660A/660B receives, via connection 670A/670B, the request from application services server 610 and proceeds to deploy the application accordingly. For example, orchestration node 660A/660B coordinates execution of cloud-level tasks using cloud-level task execution engine 664A/664B, such as to provision virtual machine 640A/640B in cloud computing environment 604A/604B. Orchestration node 660A/660B also coordinates execution of resource-level tasks using resource-level task execution engine 666A/666B, such as to cause virtual machine 640A/640B to run one or more tasks (e.g., scripts) to implement application component 642A/642B.

At 770 and 790 in FIG. 7, orchestration node 660A/660B reports status data relating to task execution by virtual machine 640A/640B to application services server 610. For example, the status data may include a status (e.g., "incomplete", "complete", "in progress"), a start time and an end time associated with each task to be executed. The status data may be sent to application services server 610 via connection 670A/670B.

At 795 in FIG. 7, application services server 610 receives the status data via connection 670A/670B and associated communication component 630/632 and determines whether the application is successfully deployed. If not, application services server 610 may repeat block 795 to wait for more status data. Otherwise (i.e., successfully deployed), application services server 610 updates deployment status data 624 in data store 620 accordingly to indicate the completion. In this case, connection 670A/670B with orchestration node 660A/660B may be stopped.

Figure 8:
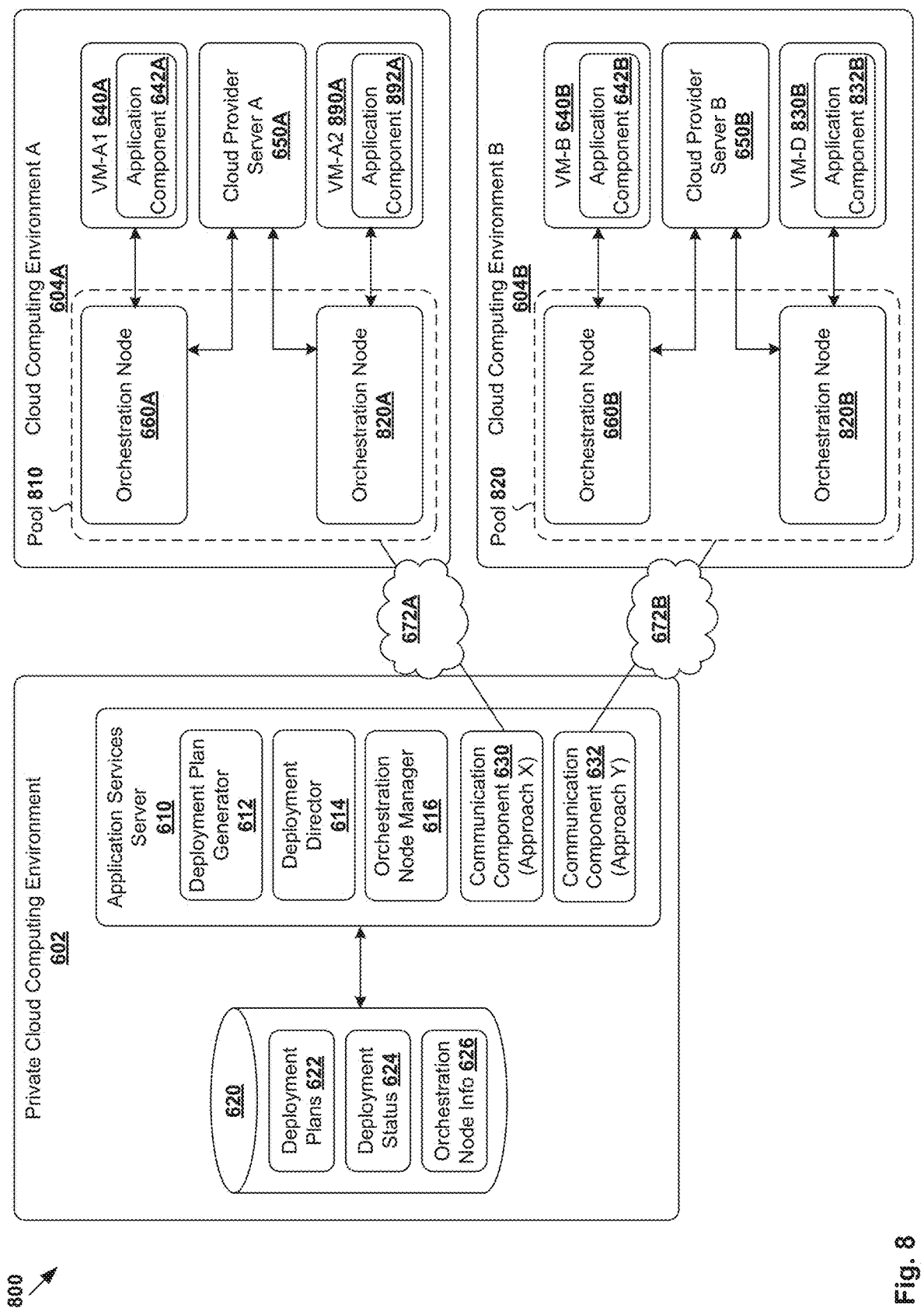
FIG. 8 is a schematic diagram illustrating example pools of orchestration nodes in the example in FIG. 6.

Detailed implementations of example process 700 may be based on the examples in FIG. 4 and FIG. 5. Although discussed with respect to application deployment in hybrid cloud computing environment 100 in FIG. 1 and FIG. 3, application services server 610 may similarly configure a pool of orchestration nodes in each cloud computing environment 604A/604B. For example, FIG. 8 is a schematic diagram illustrating example pools 810, 820 of orchestration nodes in the example in FIG. 6. Each pool 810/820 in cloud computing environment 604A/604B may include any suitable number of orchestration nodes, such as two as shown (see 660A/660B and 820A/820B).

When generating and sending requests to deploy an application at 710 and 720 in FIG. 7, application services server 610 may determine whether to create a new orchestration node, or retrieve an existing one from pool 810/820 in FIG. 8 according to the examples at 405 to 445 in FIG. 4. Communication component 630/632 may be used to establish any suitable connection (e.g., persistent, non-persistent, etc.) with a node in pool 810/820. After it is determined that an application is successfully deployed in cloud computing environment 604A/604B, application services server 610 may decide to delete or return orchestration node 660A/660B to pool 810/820 based on its reuse policy (see also FIG. 3).

When deploying the application at 740 and 750 in FIG. 7, orchestration node 660A/660B may coordinate execution of cloud-level tasks such as virtual computing resource provisioning according to the examples at 455 to 475 in FIG. 4. Further, orchestration node 660A/660B may coordinate execution of resource-level tasks according to the examples at 505 to 550 in FIG. 5, such as to generate and transmit a local deployment plan to virtual machine 640A/640B.

Orchestration node 660A/660B may obtain and report status data at 760 and 770 in FIG. 7 according to the examples at 555 and 560 in FIG. 5. Application services server 610 may process the status data at 780 and 790 in FIG. 7 according to the examples at 565 to 595 in FIG. 5. Similarly, after the application is deployed, application services server 610 may decide to delete orchestration node 660A/660B or return it to the pool based on its reuse policy.

Using the examples in FIG. 6 to FIG. 8, application services server 110 adapt to application deployment in a new cloud computing environment more easily and efficiently. For example, by configuring communication component 630/632 that is compatible with the communication approach supported by cloud computing environment 604A/604B, it is not necessary to update other operations of application services server 110 (e.g., modifying deployment plan generator 612, deployment director 614, orchestration node manage 616, or other server logic) every time it is necessary to support a new cloud computing environment.

Although an example is shown in FIG. 8, it should be understood that orchestration nodes, say 660A and 820A within the same cloud computing environment 604, may use the same communication approach or different approaches. In this case, depending on the communication approach supported by each orchestration node, application services server 610 may select a compatible communication component 630/632 to establish a connection accordingly. Similar to the example in FIG. 6, each orchestration node 660A/820A/660B/820B implements a corresponding communication component (not shown for simplicity) to communicate with application services server 110.

Example Computing System

Figure 9:
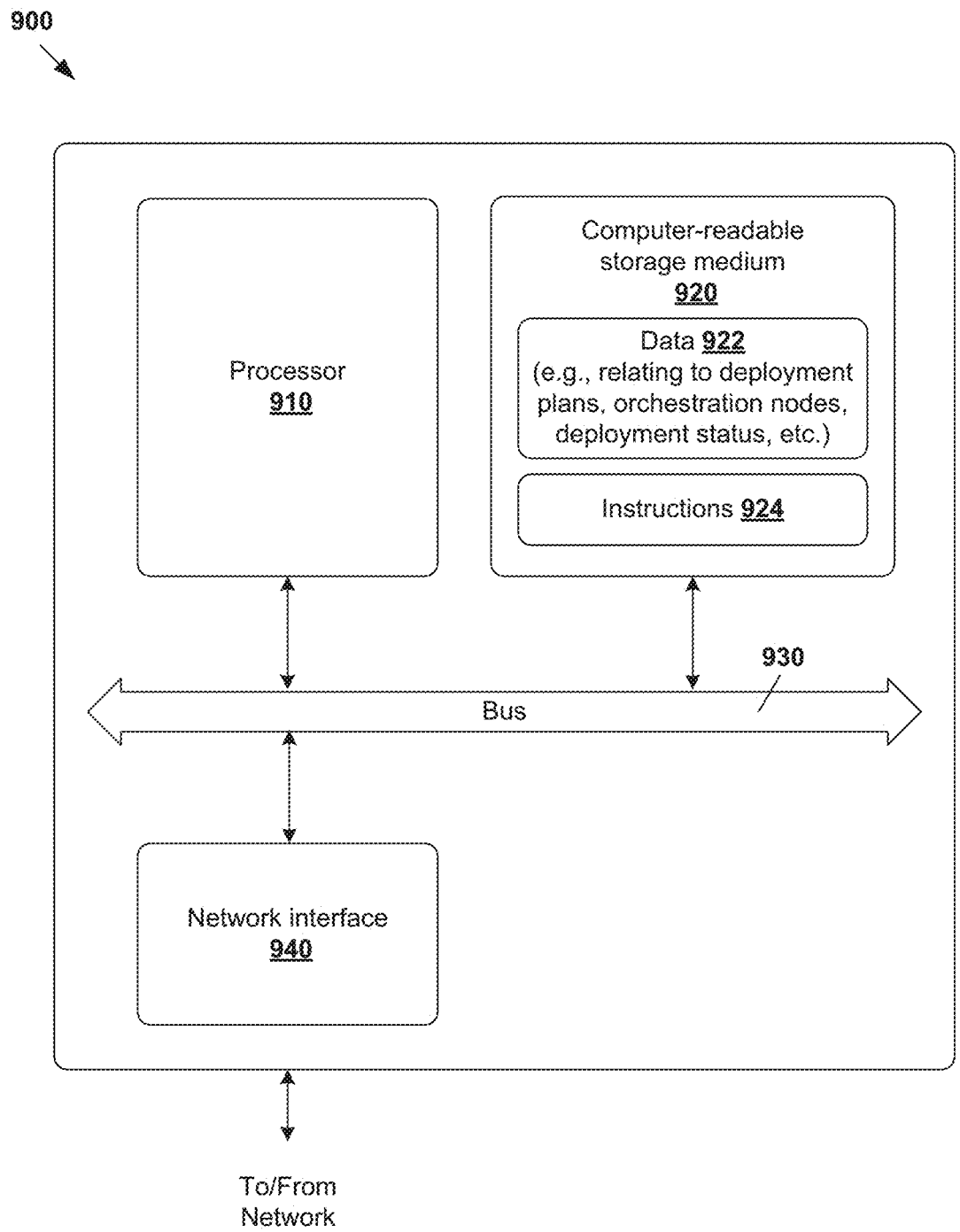
FIG. 9 is a schematic diagram illustrating an example computing system capable of acting as an application services server.

The above examples can be implemented by hardware, software or firmware or a combination thereof. FIG. 9 is a schematic diagram illustrating an example computing system 900 acting as application services server 110/610. Example computing system 900 may include processor 910, computer-readable storage medium 920, network interface 940, and bus 930 that facilitates communication among these illustrated components and other components.

Processor 910 is to perform processes described herein with reference to the drawings. Computer-readable storage medium 920 may store any suitable data 922, such as orchestration node data, deployment plans, deployment status data, etc. Computer-readable storage medium 920 may further store computer-readable instructions 924 which, in response to execution by processor 910, cause processor 910 to perform processes described herein with reference to the drawings.

Although examples of the present disclosure refer to "virtual machines", it should be understood that virtual machines running within a virtualization environment are merely one example of workloads. In general, a workload may represent an addressable data compute node or isolated user space instance. In practice, any suitable technologies aside from hardware virtualization may be used to provide isolated user space instances. For example, other workloads may include physical hosts, client computers, containers (e.g., running on top of a host operating system without the need for a hypervisor or separate operating system), virtual private servers, etc. The virtual machines may also be complete computation environments, containing virtual equivalents of the hardware and system software components of a physical computing system.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computing system in a private cloud computing environment to deploy an application in a hybrid cloud computing environment, the method comprising:

generating a request to deploy an application in a public cloud environment, wherein the request includes a deployment plan specifying one or more tasks to be executed by a virtual computing resource from a cloud provider to deploy the application, wherein the deployment plan is to deploy a multi-tier application;

sending, to an orchestration node in the public cloud computing environment, the request to instruct the orchestration node to provision the virtual computing resource from the cloud provider and to cause the virtual computing resource to execute the one or more tasks and to coordinate execution of tasks by multiple virtual computing resources to deploy multiple application components of the multi-tier application according to an order specified by the deployment plan;

receiving in the private cloud computing environment from the orchestration node in the public cloud environment, status data relating to execution of the one or more tasks by the virtual computing resource; and based on the received status data, determining whether the application is successfully deployed in the public cloud computing environment.

2. The method of claim 1, wherein the method further comprises:
   establishing a persistent connection from the computing system to the orchestration node to send the request and to receive the status data.

3. The method of claim 1, wherein the method further comprises:
   prior to sending the request, creating the orchestration node in the public cloud computing environment.

4. The method of claim 1, wherein the method further comprises:
   prior to sending the request, retrieving the orchestration node from a pool of multiple orchestration nodes configured in the public cloud computing environment.

5. The method of claim 4, wherein the method further comprises:
   in response to determination that the application is successfully deployed, determining whether to delete the orchestration node or to return the pool of multiple orchestration nodes.

6. The method of claim 5, wherein determining whether to delete the orchestration node or to return the orchestration node to the pool comprises:
   retrieving a reuse policy of the orchestration node from a data store; and
   determining to return the orchestration node to the pool if the orchestration node is reusable based on the reuse policy, but otherwise determining to delete the orchestration node.

7. A non-transitory computer-readable storage medium that includes a set of instructions which, in response to execution by a processor of a computing system in a private cloud computing environment, causes the processor to perform a method to deploy an application in a hybrid cloud computing environment, the method comprising:
   generating a request to deploy an application in a public cloud environment, wherein the request includes a deployment plan specifying one or more tasks to be executed by a virtual computing resource from a cloud provider to deploy the application, wherein the deployment plan is to deploy a multi-tier application;
   sending, to an orchestration node in the public cloud computing environment, the request to instruct the orchestration node to provision the virtual computing resource from the cloud provider and to cause the virtual computing resource to execute the one or more tasks and to coordinate execution of tasks by multiple virtual computing resources to deploy multiple application components of the multi-tier application according to an order specified by the deployment plan;
   receiving in the private cloud computing environment, from the orchestration node in the public cloud environment, status data relating to execution of the one or more tasks by the virtual computing resource; and
   based on the received status data, determining whether the application is successfully deployed in the public cloud computing environment.

8. The non-transitory computer-readable storage medium of claim 7, wherein the method further comprises:
   establishing a persistent connection from the computing system to the orchestration node to send the request and to receive the status data.

9. The non-transitory computer-readable storage medium of claim 7, wherein the method further comprises:
   prior to sending the request, creating the orchestration node in the public cloud computing environment.

10. The non-transitory computer-readable storage medium of claim 7, wherein the method further comprises:
    prior to sending the request, retrieving the orchestration node from a pool of multiple orchestration nodes configured in the public cloud computing environment.

11. The non-transitory computer-readable storage medium of claim 10, wherein the method further comprises:
    in response to determination that the application is successfully deployed, determining whether to delete the orchestration node or to return the pool of multiple orchestration nodes.

12. The non-transitory computer-readable storage medium of claim 11, wherein determining whether to delete the orchestration node or to return the pool comprises:
    retrieving a reuse policy of the orchestration node from a data store; and
    determining to return the orchestration node to the pool if the orchestration node is reusable based on the reuse policy, but otherwise determining to delete the orchestration node.

13. A computing system in a private cloud computing environment to deploy an application in a hybrid cloud computing environment, wherein the computing system comprises:
    a processor; and
    a non-transitory computer-readable storage medium storing instructions that, when executed by the processor, cause the processor to:
       generate a request to deploy an application in a public cloud environment, wherein the request includes a deployment plan specifying one or more tasks to be executed by a virtual computing resource from a cloud provider to deploy the application, wherein the deployment plan is to deploy a multi-tier application;
       send, to an orchestration node in the public cloud computing environment, the request to instruct the orchestration node to provision the virtual computing resource from the cloud provider and to cause the virtual computing resource to execute the one or more tasks and to coordinate execution of tasks by multiple virtual computing resources to deploy multiple application components of the multi-tier application according to an order specified by the deployment plan;
       receive in the private cloud computing environment, from the orchestration node in the public cloud environment, status data relating to execution of the one or more tasks by the virtual computing resource; and
       based on the received status data, determine whether the application is successfully deployed in the public cloud computing environment.

14. The computing system of claim 13, wherein the instructions further cause the processor to:

establish a persistent connection from the computing system to the orchestration node to send the request and to receive the status data.

15. The computing system of claim 13, wherein the instructions further cause the processor to:
   prior to sending the request, create the orchestration node in the public cloud computing environment.

16. The computing system of claim 13, wherein the instructions further cause the processor to:
   prior to sending the request, retrieve the orchestration node from a pool of multiple orchestration nodes configured in the public cloud computing environment.

17. The computing system of claim 16, wherein the instructions further cause the processor to:
   in response to determination that the application is successfully deployed, determine whether to delete the orchestration node or to return the pool of multiple orchestration nodes.

18. The computing system of claim 17, wherein the instructions further cause the processor to:
   retrieve a reuse policy of the orchestration node from a data store; and
   determine to return the orchestration node to the pool if the orchestration node is reusable based on the reuse policy, but otherwise determining to delete the orchestration node.

* * * * *